(12) United States Patent
Liu et al.

(10) Patent No.: US 7,997,713 B2
(45) Date of Patent: Aug. 16, 2011

(54) THERMAL INK-JET INCLUDING POLYMER ENCAPSULATED PIGMENT

(75) Inventors: Hui Liu, San Diego, CA (US); Paul Bruinsma, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 781 days.

(21) Appl. No.: 11/726,938

(22) Filed: Mar. 23, 2007

(65) Prior Publication Data
US 2008/0231678 A1    Sep. 25, 2008

(51) Int. Cl.
*C09D 11/00* (2006.01)
(52) U.S. Cl. .................................. 347/100; 106/31.13
(58) Field of Classification Search .............. 347/100; 106/31.13
See application file for complete search history.

(56) References Cited

U.S. PATENT DOCUMENTS

| | | | |
|---|---|---|---|
| 5,886,065 A | 3/1999 | Tsang et al. | |
| 6,040,358 A | 3/2000 | Page et al. | |
| 6,498,202 B1 | 12/2002 | Sun et al. | |
| 6,635,320 B2 * | 10/2003 | Wakata et al. | 428/32.26 |
| 6,713,530 B2 | 3/2004 | Wang et al. | |
| 7,119,133 B2 | 10/2006 | Vincent et al. | |
| 2003/0055135 A1 | 3/2003 | Alford | |
| 2004/0094065 A1 | 5/2004 | Reem | |
| 2004/0157956 A1 * | 8/2004 | Vincent et al. | 523/160 |
| 2005/0128272 A1 * | 6/2005 | Morohoshi et al. | 347/100 |
| 2005/0176847 A1 * | 8/2005 | Cagle | 523/160 |
| 2005/0228071 A1 | 10/2005 | Vasudevan | |
| 2005/0234189 A1 * | 10/2005 | Lee et al. | 524/800 |

FOREIGN PATENT DOCUMENTS

| | | |
|---|---|---|
| EP | 0 779 348 | 6/1997 |
| EP | 1 561 788 | 8/2005 |
| EP | 1 586 611 | 10/2005 |

* cited by examiner

*Primary Examiner* — Laura E Martin

(57) ABSTRACT

The present invention is drawn to thermal ink-jet inks including a polymer encapsulated pigment, and systems and methods that use the same. Such polymer encapsulated pigments are the result of polymerization at the surface of the pigment using a plurality of monomers, where about 6 wt % to about 15 wt % of the monomers are acidic.

21 Claims, No Drawings

THERMAL INK-JET INCLUDING POLYMER ENCAPSULATED PIGMENT

BACKGROUND OF THE INVENTION

The majority of inks and toners used in the printing industry employ water insoluble polymers for print adhesion and durability. Water-based inks, such as used in ink-jet printing, can incorporate water insoluble polymers as dispersed particulates. The particulates are typically designed to allow formation of a print-film on the printed substrate. Alternatively, these water insoluble polymers can be coated on the surface of pigments in the form of polymer-encapsulated pigments.

Polymer encapsulated pigments of various kinds are known in the colorant art. The Sunsperse® and Flexiverse® polymer coated pigments from Sun Chemical Corp. are representative. While some encapsulation methods and chemistries are known, ink-jet inks including such polymer encapsulated pigments often do not perform well in thermal ink-jet architecture. One prevalent method involves capsules formed typically with dissolved polymers that are adsorbed onto the pigment surface. Inasmuch as the dissolved polymers are usually not crosslinked, the polymer surfaces of such known encapsulated pigments typically agglomerate under the high thermal shear and solvent conditions of the pen firing chamber, causing nozzle and ink channel blockages. Thus, typically, the incorporation of such polymer encapsulated pigments within thermal ink-jet inks typically results in poor pen reliability.

Conversely, the introduction of separate pigment and polymer particle components has several shortcomings as well. The combined surface areas of the latex and pigment particles adversely modify the viscosity of the ink-jet such that drop ejection rates are limited to lower than otherwise norms. Such viscosities also negatively impact the collapse of nucleated vapor bubbles on thermal drop ejection, entrapping gas within firing chamber upon subsequent firings. Entrapped gas significantly retards ink-jettability. Likewise, differences between latex and pigment surface charges and charge levels can induce dispersion instabilities and performance changes within the ink over time. In addition, the pigment and latex often dissociate in the fibers of plain paper reducing both the otherwise durability and optical density of the print. Still further, many entrapped pigment particles are exposed above the surface of the latex film, lowering print gloss and inducing gloss non-uniformities between different colored pigments within a print.

Thus, there is a continued need for development of pigment- and polymeric material-containing ink-jettable inks that are reliable when using thermal ink-jet architecture.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle" or "ink vehicle" refers to the liquid fluid in which colorant is dispersed or dissolved to form an ink. Liquid vehicles are well known in the art, and a wide variety of ink vehicles may be used in accordance with embodiments of the present invention. Such liquid vehicles may include a mixture of a variety of different agents, including without limitation, surfactants, solvents, co-solvents, buffers, biocides, viscosity modifiers, sequestering agents, stabilizing agents, and/or water. The liquid vehicle can also carry other additives such as latex particulates and other polymers, UV curable materials, and/or plasticizers, in some embodiments.

As used herein, "acidic monomer" is used to indicate any monomer with an acidic functional group.

As used herein "drop velocity" is a measurement of the velocity of a drop of liquid or suspension, e.g., ink, as taken upon ejection from printing architecture.

As used herein "drop weight" as used herein, indicates a measurement of the weight of the drop ejected from the printing architecture.

As used herein, "thermal ink-jet architecture" is distinguished from other printing architecture in that they rely on heating elements to print images. Specifically, thermal ink-jet print heads have a series of tiny electrically heated chambers. In printing, an electrical current is sent through heating elements, forming a bubble which then propels a droplet of ink onto a print media. When a droplet of ink is ejected from the printer, more ink is drawn into the chamber.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

With these definitions in mind, an inkjet ink is presented for use in thermal ink-jet architecture. The ink-jet ink includes a polymer encapsulated pigment and can be formulated so as to have a drop velocity of at least 10 m/s when ink-jetted from thermal ink-jet architecture with a drop weight of less than about 9 ng. The polymer encapsulating the pigment is polymerized at the surface of the pigment using a plurality of monomers. About 6 wt % to about 15 wt % of the monomers are acidic.

In another embodiment, a method of printing an image can comprise thermally ink-jetting an ink-jet ink onto a substrate to form an image. The ink-jet ink can include a polymer encapsulated pigment, wherein the polymer is polymerized at the surface of the pigment using a plurality of monomers, wherein about 6 wt % to about 15 wt % of the monomers are acidic. The ink-jet ink can be formulated such that when ejected from thermal ink-jet architecture with a drop weight of less than about 9 nm, the ink-jet ink is jettable at a drop velocity of at least 10 m/s.

In another embodiment, a system for printing images can comprise a media substrate and a first ink-jet pen containing a first ink-jet ink. The first ink-jet ink can include a polymer encapsulated pigment, wherein the polymer is polymerized at the surface of the pigment using a plurality of monomers, wherein about 6 wt % to about 15 wt % are acidic monomers. The ink-jet ink can be formulated such that when ejected from thermal ink-jet architecture with a drop weight of less than about 9 ng, the ink-jet ink is jettable at a drop velocity of at least 10 m/s.

In accordance with these embodiments, various details are provided herein which are applicable to each of the method, thermal ink-jet ink, and associated system for printing images. For example, the pigment in the ink-jet ink can comprise or consist essentially of cyan, magenta, or yellow pigment. Alternatively, the pigment can be black. In some cases, the total pigment can consist of mixtures of any color and/or type of pigment, or can consist of any single color and type of pigment.

As mentioned, the pigments used in the ink-jet ink are polymer encapsulated. More specifically, the pigments are encapsulated with a polymer which is polymerized at the surface of the pigment in an in situ process. Generally, in one in-situ encapsulation process, a dispersion including monomers and the pigment particles can be homogenized. The monomers in the dispersion are then polymerized at the surface of the pigment so as to encapsulate the pigment particles. Such polymerization may include potassium persulfate solution, and an optional surfactant. In accordance with embodiments of the present invention, the pigment is encapsulated such that about 6 wt % to about 15 wt % of the monomers used in the polymerization at the surface of the pigment are acidic. Non-limiting examples of acidic monomers include acrylic acid, methacrylic acid, vinyl benzoic acid, and/or methacryloyloxyethylsuccinate. In one embodiment, from about 6 wt % about 10 wt % to of the monomers are acidic. In another embodiment, from 8 wt % to about 10 wt % of the monomers are acidic. The acidic monomers, upon polymerization, can assist the pigment to remain properly dispersed in the ink-jet ink. Though it is generally desirable to include higher acid content for improving some characteristics, when performing in-situ polymerization at the surface of the pigment, an acidic monomer content that is too high has a tendency to leach out of the polymer and into the solution, which can have an adverse effect on the ink and the architecture used in for storing and printing the ink. As a result, the about 6 wt % to about 15 wt % of acidic monomers provides a good balance between acceptably high acid content that does not significantly leach out into the liquid vehicle during polymerization.

Inks utilizing these polymer encapsulated pigments can be formulated to have a drop velocity of at least 10 m/s when ejected from thermal ink-jet architecture with a drop weight of less than about 9 ng. In further embodiments, the ink can have a drop velocity of 12 m/s when ejected from thermal ink-jet architecture with a drop weight of less than about 9 ng. In still another embodiments, the ink can have a drop velocity of 14 m/s when ejected from thermal ink-jet architecture with a drop weight of less than about 9 ng.

Typical liquid vehicle formulations that can be used with the polymer encapsulated pigments described herein can include water, and optionally, one or more co-solvents present in total at from about 5 wt % to about 50 wt %. Further, one or more non-ionic, cationic, and/or anionic surfactants can be present. Such surfactants typically ranging from 0 wt % to 5 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Non-limiting examples of classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Typically, surfactant can be added in the range from 0 wt % to 5 wt %. Inks of the present invention can have a viscosity from about 1.5 cps to about 6 cps.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

The disclosed ink-jet ink can be used to print an image. Accordingly, a system and method of printing an image can include thermally ink-jetting an ink-jet ink onto a substrate to form an image. In an aspect, a second ink-jet ink can be thermally ink-jetted (from a second ink-jet pen) onto the substrate to form an image. As with the first ink-jet ink, the second ink-jet ink can include a polymer encapsulated pigment, consistent with the parameters disclosed herein regarding polymerization. Further, the second ink-jet ink can also be formulated so that when ejected from thermal ink-jet architecture with a drop velocity of less than about 9 ng, the ink-jet ink is jettable at a drop velocity of at least 10 m/s. In some instances, the first ink and the second ink can be of different colors (i.e. cyan, magenta, yellow, or black).

In either the system or method, the first ink-jet ink and the second ink-jet ink can be or utilize different hues. By way of example, and not intended to be limiting, the hues of the first ink-jet ink and the second ink-jet ink can be selected from cyan, magenta, and yellow inks. For example, the first ink-jet ink can be cyan and the second ink-jet ink can be magenta.

The system and method can also include jetting a third ink-jet ink from a third ink-jet pen. As with the first ink-jet ink and the second ink-jet ink, the third ink-jet ink can be the type of the present invention. In such embodiment, the first ink-jet ink can be cyan, the second ink-jet ink can be magenta, and the third ink-jet ink can be yellow. Consistent with some current uses, the system can further include a black ink-jet ink. Although not required, the black ink-jet ink can also be of the type disclosed herein.

The media substrate included in the system can be of any type known or used in the printing field. In a specific embodiment, the media substrate is coated with a polymer-based swellable coating or an inorganic particulate-based coating.

The formation of thermal ink-jet inks in accordance with the above embodiments provides several advantages. For example, polymer-encapsulation of pigments tends to reduce the number of total particles in solution (as opposed to having separate latex particulates co-dispersed with the pigments) and their combined surface areas such that the pigment suspension, e.g., ink, viscosity can be reduced. Encapsulation also prevents pigment-latex separation when applied to a substrate, e.g., ink printed on a media substrate, such that durability and optical density are more optimized. Polymer-encapsulated pigments also facilitate the result that each pigment particle becomes trapped below the surface of latex formed films (after printing) such that gloss and color-to-color gloss uniformity is enhanced.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Encapsulated Cyan Pigment

A first mixture was prepared with 50 g of Cyan Pigment PB 15:3 (containing 20 wt % pigment) and 45 g water. A second mixture was prepared using 7.5 g methyl methacrylate, 2.5 g butyl acrylate, 0.5 g hydroxyethyl acrylate, 0.85 g methacrylic acid, 0.5 g of 10% aqueous sodium dodecyl sulfate (SDS) solution, 8 g of hexadecane, and 76.5 g water. The first mixture and the second mixture were separately sonicated for 2 minutes each. The first mixture and the second mixture were mixed together to create a third mixture. The third mixture was sonicated for 2 more minutes. Following sonication, to the mixture was added 0.95 g of Aerosol OT, 0.1 g potassium persulfate, and 10 g water. The reaction mixture was heated for approximately 3 hours.

Example 2

Ink Formulation 1

An ink composition was prepared according to Table 1:

TABLE 1

| Component | Wt % |
| --- | --- |
| Encapsulated Pigment (from Example 1) | 1-3 wt % |
| Co-solvent system (including 2-pyrrolidinone, glycerol, 1,2 hexanediol and diethylene glycol) | 8-15 wt % |
| Resin | 0.1-2 wt % |
| Surfactant | 0.05-2 wt % |

TABLE 1-continued

| Component | Wt % |
| --- | --- |
| Preservative/Anti-microbial | 0.05-2 wt % |
| Water | balance |

The ink of Example 2 can be ink-jetted from an HP Officejet Pro K550 or an HP Photosmart Pro B9180 at a drop weight of less than about 9 ng and at a drop velocity of at least 10 m/s, 12 m/s, or even 14 m/s.

Example 3

Ink Formulation 2

An ink composition was prepared according to Table 2:

TABLE 2

| Component | Wt % |
| --- | --- |
| Encapsulated Pigment (from Example 1) | 1-3 wt % |
| Co-solvent system (including 2-pyrrolidinone) | 8-25 wt % |
| Ethoxylated glycerol derivative | 0.5-3 wt % |
| Surfactant | 0.05-2 wt % |
| Preservative/Anti-microbial | 0.05-2 wt % |
| Water | balance |

The ink of Example 3 can be printed from an HP Officejet Pro K550 or an HP Photosmart Pro B9180 at a drop weight of less than about 9 ng and at a drop velocity of at least 10 m/s, 12 m/s, or even 14 m/s.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A thermal ink-jet ink, comprising a polymer encapsulated pigment, wherein the polymer is polymerized at the surface of the pigment using a plurality of monomers, wherein about 6 wt % to about 15 wt % of the monomers are acidic and wherein said ink-jet ink is formulated such that when ejected from thermal ink-jet architecture with a drop weight of less than about 9 ng, the ink-jet ink is jettable at a drop velocity of at least 10 m/s.

2. The ink-jet ink of claim 1, wherein the pigment is cyan, magenta, or yellow pigment.

3. The ink-jet ink of claim 1, wherein the pigment is black.

4. The ink-jet ink of claim 1, wherein the monomers that are acidic include acrylic acid, methacrylic acid, vinyl benzoic acid, or methacryloyloxyethylsuccinate.

5. The ink-jet ink of claim 1, wherein from about 6 wt % to about 10 wt % of the monomers are acidic.

6. The ink-jet ink of claim 4, wherein from about 8 wt % to about 10 wt % of the monomers are acidic.

7. The ink-jet ink of claim 1, wherein the ink-jet ink is jettable at a drop velocity of at least 14 m/s when ejected from thermal ink-jet architecture with a drop weight of less than about 9 ng.

8. A method of printing an image, comprising thermally ink-jetting an ink-jet ink onto a substrate to form an image, said ink-jet ink including a polymer encapsulated pigment, wherein the polymer is polymerized at the surface of the pigment using a plurality of monomers, wherein about 6 wt % to about 15 wt % of the monomers are acidic, and wherein said ink-jet ink is ejected from thermal ink-jet architecture with a drop weight of less than about 9 nm at a drop velocity of at least 10 m/s.

9. The method of claim 8, wherein the pigment is cyan, magenta, or yellow.

10. The method of claim 8, wherein the pigment is black.

11. The method of claim 8, wherein the monomers that are acidic include acrylic acid, methacrylic acid, vinyl benzoic acid, or methacryloyloxyethylsuccinate.

12. The method of claim 8, wherein from about 6 wt % to about 10 wt % of the monomers are acidic.

13. The method of claim 8, wherein the drop velocity is at least 12 m/s.

14. The method of claim 8, further comprising thermally ink-jetting a second ink-jet ink onto the substrate to form the image, said second ink-jet ink including a polymer encapsulated pigment, wherein the polymer is polymerized at the surface of the pigment using a plurality of monomers, wherein about 6 wt % to about 15 wt % of the monomers are acidic, and wherein said ink-jet ink is ejected from thermal ink-jet architecture with a drop weight of less than about 9 ng at a drop velocity of at least 10 m/s.

15. A system for printing images, comprising:
a) a media substrate; and
b) a first thermal ink-jet pen containing a first thermal ink-jet ink,
wherein said first thermal ink-jet pen has a thermal ink-jet architecture configured to ink-jet the first thermal ink-jet ink with a drop weight of less than about 9 ng at a drop velocity of at least 10 m/s, said first thermal ink-jet ink including a polymer encapsulated pigment, wherein the polymer is polymerized at the surface of the pigment using a plurality of monomers, wherein about 6 wt % to about 15 wt % are acidic monomers, and wherein said thermal ink-jet ink is formulated such that when ejected from thermal ink-jet architecture with a drop weight of less than about 9 ng, the thermal ink-jet ink is jettable at a drop velocity of at least 10 m/s.

16. The system of claim 15, further comprising a second ink-jet pen containing a second thermal ink-jet ink, wherein said second thermal ink-jet pen has a thermal ink-jet architecture configured to ink-jet the second thermal ink-jet ink with a drop weight of less than about 9 ng at a drop velocity of at least 10 m/s, said second thermal ink-jet ink also including a polymer encapsulated pigment, wherein the polymer is polymerized at the surface of the pigment using a plurality of monomers, wherein about 6 wt % to about 15 wt % are acidic monomers, and wherein said thermal ink-jet ink is formulated such that when ejected from thermal ink-jet architecture with a drop weight of less than about 9 ng, the thermal ink-jet ink is jettable at a drop velocity of at least 10 m/s, and wherein the first thermal ink-jet ink and the second thermal ink-jet ink are of a different hue.

17. The system of claim 16, further comprising a third ink-jet pen containing a third thermal ink-jet ink, wherein said third thermal ink-jet pen has a thermal ink-jet architecture configured to ink-jet the third thermal ink-jet ink with a drop weight of less than about 9 ng at a drop velocity of at least 10 m/s, said third thermal ink-jet ink also including a polymer encapsulated pigment, wherein the polymer is polymerized at the surface of the pigment using a plurality of monomers, wherein about 6 wt % to about 15 wt % are acidic monomers, and wherein said thermal ink-jet ink is formulated such that when ejected from thermal ink-jet architecture with a drop weight of less than about 9 ng, the thermal ink-jet ink is jettable at a drop velocity of at least 10 m/s, and wherein first thermal ink-jet ink is cyan, the second thermal ink-jet ink is magenta, and the third thermal ink-jet ink is yellow.

18. The system of claim 17, further comprising a black thermal ink-jet ink.

19. The system of claim 18, further wherein the black thermal ink-jet ink is formulated in a fourth ink-jet pen, wherein said fourth thermal ink-jet pen has a thermal ink-jet architecture configured to ink-jet the black thermal ink-jet ink with a drop weight of less than about 9 ng at a drop velocity of at least 10 m/s, said black thermal ink-jet ink also including a polymer encapsulated pigment, wherein the polymer is polymerized at the surface of the pigment using a plurality of monomers, wherein about 6 wt % to about 15 wt % are acidic monomers, and wherein said thermal ink-jet ink is formulated such that when ejected from thermal ink-jet architecture with a drop weight of less than about 9 ng, the thermal ink-jet ink is jettable at a drop velocity of at least 10 m/s.

20. The system of claim 15, wherein the media substrate is a substrate coated with a polymer-based swellable coating or an inorganic particulate-based coating.

21. The ink-jet ink of claim 1, wherein the polymer is polymerized from methyl methacrylate, butyl acrylate, hydroxyethyl acrylate, and methacrylic acid.

* * * * *

UNITED STATES PATENT AND TRADEMARK OFFICE
CERTIFICATE OF CORRECTION

| | | |
|---|---|---|
| PATENT NO. | : 7,997,713 B2 | Page 1 of 1 |
| APPLICATION NO. | : 11/726938 | |
| DATED | : August 16, 2011 | |
| INVENTOR(S) | : Hui Liu et al. | |

It is certified that error appears in the above-identified patent and that said Letters Patent is hereby corrected as shown below:

On the Title page, in field (54), Title, in column 1, line 1, delete "INCLUDING" and insert -- INK INCLUDING --, therefor.

In column 1, line 1, delete "INCLUDING" and insert -- INK INCLUDING --, therefor.

Signed and Sealed this
Fifteenth Day of May, 2012

David J. Kappos
*Director of the United States Patent and Trademark Office*